(12) United States Patent
Minami

(10) Patent No.: US 9,781,397 B2
(45) Date of Patent: Oct. 3, 2017

(54) PROJECTOR AND PROJECTOR SYSTEM

(71) Applicant: Panasonic Intellectual Property Management Co., Ltd., Osaka (JP)

(72) Inventor: Kazuhiro Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/272,221

(22) Filed: Sep. 21, 2016

(65) Prior Publication Data
US 2017/0099472 A1    Apr. 6, 2017

(30) Foreign Application Priority Data

Oct. 5, 2015 (JP) .................................. 2015-197268
Sep. 12, 2016 (JP) .................................. 2016-177339

(51) Int. Cl.
H04N 9/31 (2006.01)
(52) U.S. Cl.
CPC ......... H04N 9/3185 (2013.01); H04N 9/3147 (2013.01); H04N 9/3194 (2013.01)
(58) Field of Classification Search
CPC ... H04N 9/3185; H04N 9/3147; H04N 9/3194
See application file for complete search history.

(56) References Cited

U.S. PATENT DOCUMENTS

| 6,570,623 | B1 * | 5/2003 | Li | H04N 9/3194 348/383 |
| 9,560,327 | B2 * | 1/2017 | Ehara | H04N 9/3185 |
| 2004/0041996 | A1 | 3/2004 | Abe | |
| 2004/0246495 | A1 | 12/2004 | Abe | |
| 2009/0201431 | A1 | 8/2009 | Izumida | |
| 2011/0199546 | A1 | 8/2011 | Izumida | |
| 2012/0057083 | A1 | 3/2012 | Izumida | |
| 2013/0229580 | A1 * | 9/2013 | Ishibashi | G09G 3/001 348/571 |
| 2014/0354674 | A1 * | 12/2014 | Okamoto | G09G 5/02 345/590 |
| 2015/0138071 | A1 | 5/2015 | Ichieda | |

FOREIGN PATENT DOCUMENTS

| JP | 2004-110804 | 4/2004 |
| JP | 2006-023133 | 1/2006 |
| JP | 2006-170744 | 6/2006 |

(Continued)

*Primary Examiner* — Michael Teitelbaum
(74) *Attorney, Agent, or Firm* — Wenderoth, Lind & Ponack, L.L.P.

(57) ABSTRACT

A projector according to the present disclosure includes: a projection unit, a lens unit, an imaging unit, and a computing unit. The projection unit displays a first image. The lens unit projects the first image that is displayed by the projection unit. The imaging unit images a second image, which is projected by another projector, through the lens unit. The computing unit computes a distance between a surface on which the second image is projected and the another projector. Such the distance is computed from imaging data of the second image imaged by the imaging unit, and from spacing information on a spacing between the projector concerned and the another projector.

14 Claims, 10 Drawing Sheets

(56) References Cited

FOREIGN PATENT DOCUMENTS

| | | |
|---|---|---|
| JP | 3941631 B | 7/2007 |
| JP | 2009-219102 | 9/2009 |
| JP | 4556555 B | 10/2010 |
| JP | 2011-515703 | 5/2011 |
| JP | 2015-099522 | 5/2015 |
| WO | 2009/120623 | 10/2009 |

* cited by examiner

PROJECTOR AND PROJECTOR SYSTEM

BACKGROUND

Technical Field

The present disclosure relates to projectors and projector systems which are capable of calculating distances between the projectors and a projection surface on which the projectors project an image.

Description of the Related Art

A conventional projection system is equipped with two apparatuses, that is, a projector including a projection unit to project an image, and a camera including an imaging unit to image the image that is projected on a projection surface by the projector. Alternatively, a conventional projection system is such that a projection unit and an imaging unit are disposed at separate positions on the inside of one projector. These units respectively perform projecting and imaging operations, through use of respective different lenses. Then, each of such conventional projector systems operates as follows: An image projected on the projection surface by the projection unit is imaged by the imaging unit. From the imaged data, distance information on a distance between the projector and the projection surface is acquired.

CITATION LIST

Patent Literature

PTL 1: Japanese Patent No. 4556555

SUMMARY

A projector system using a plurality of projectors, however, has the following problem when adopting the configuration described above. That is, the system requires cameras equal in number to the number of the projectors, resulting in the need for the increased number of apparatuses and for an increased area for installation of the apparatuses. Alternatively, as in the case of the conventional configuration described above, when one projector is equipped with both a projection unit and an imaging unit, the units require different lenses on a one-for-one basis, resulting in increased volume and costs of the projector.

The present disclosure is aimed at solving such a problem of conventional projectors, and intended to provide a projector and a projector system which each have a reduced volume and the reduced number of their apparatuses.

To solve the problem of conventional projectors as described above, a projector according to the present disclosure includes: a projection unit, a lens unit, an imaging unit, and a computing unit. The projection unit displays a first image. The lens unit projects the first image that is displayed by the projection unit. The imaging unit images a second image, which is projected by another projector, through the lens unit. The computing unit computes a distance between a surface on which the second image is projected and the another projector. Such the distance is computed from imaging data of the second image imaged by the imaging unit, and from spacing information on a spacing between the projector concerned and the another projector.

A projector system according to the present disclosure includes: a first projector for projecting a first image, a second projector for projecting a second image, and a control box for communicating with the first projector and the second projector. The first projector includes: a projection unit for displaying the first image, a lens unit for projecting the first image that is displayed by the projection unit, an imaging unit for imaging the second image through the lens unit, and a first communication unit for transmitting both positional information on the first projector and imaging data of the second image imaged by the imaging unit. The second projector includes a second communication unit for transmitting positional information on the second projector. The control box includes a third communication unit and a computing unit. The third communication unit receives the imaging data and the positional information on the first projector from the first communication unit, and receives the positional information on the second projector from the second communication unit. The computing unit computes spacing information on a spacing between the first projector and the second projector. The spacing information is computed from the imaging data, the positional information on the first projector, and the positional information on the second projector. Moreover, the computing unit computes a distance between a surface on which the second image is projected and the second projector. The distance is computed from the spacing information and the imaging data.

With this configuration, the projection and imaging units share the same lens with one another, allowing the implementation of a reduced-size and less-cost projector. Moreover, such a projector is capable of imaging an image projected by another projector. This allows a reduction in the number of the apparatuses which are used in the projection system configured with a plurality of the projectors.

In accordance with the present disclosure, the projector and the projector system can be implemented, featuring the reduced volume and the reduced number of the apparatuses used therein.

DETAILED DESCRIPTION OF THE PREFERRED EMBODIMENT

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the accompanying drawings and the following descriptions are presented to facilitate fully understanding of the present disclosure by those skilled in the art and, therefore, are not intended to impose any limitations on the subject matter described in the appended claims.

First Exemplary Embodiment

Figure 1:
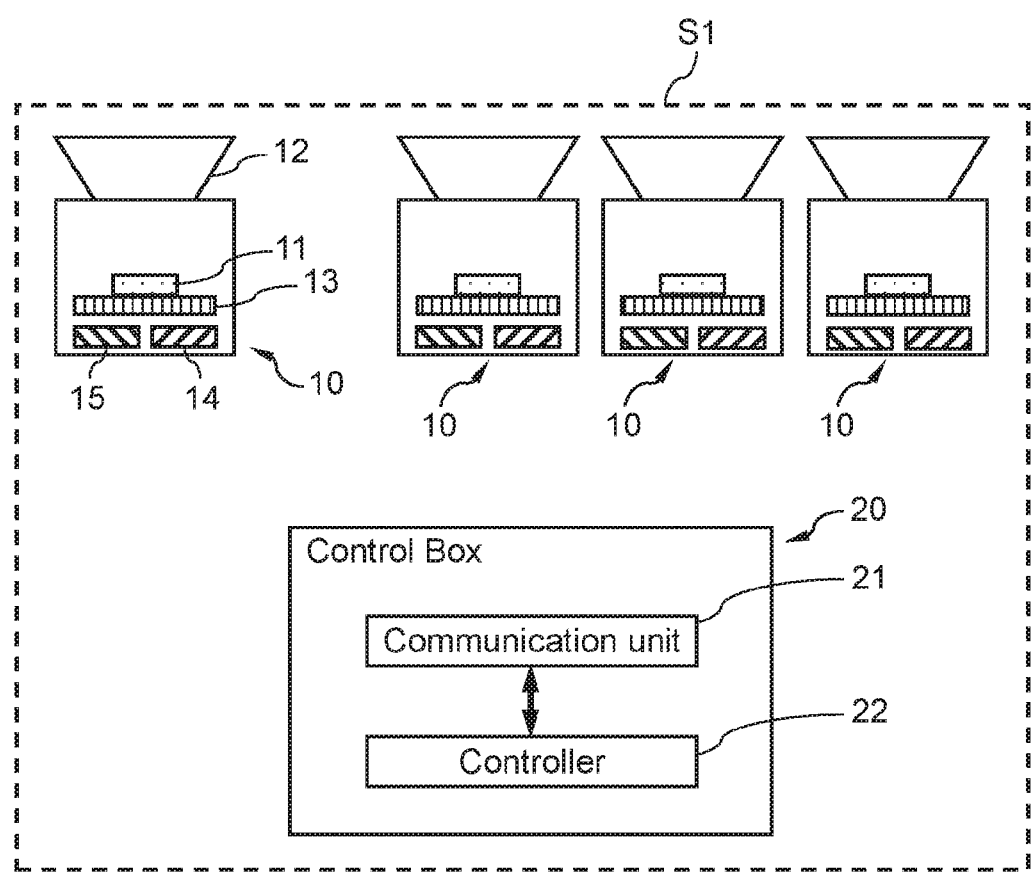
FIG. 1 is a schematic view of a projector system according to a first embodiment.

FIG. 1 is a schematic view of projector system S1 according to a first embodiment. Projector system S1 is configured with a plurality of projectors 10 (e.g. four projectors in FIG. 1) which project images, and control box 20 which communicates with the plurality of projectors 10, regarding imaging data, positional information, etc.

As shown in FIG. 1, each of projectors 10 includes projection unit 11, lens unit 12, imaging unit 13, communication unit 14, and computing unit 15.

Projection unit 11 displays and projects an image, which thereby causes projector 10 to project the image. Projection unit 11 is configured with a spatial light modulator, such as, a digital micromirror device or a liquid crystal on silicon (LCOS), for example.

Lens unit 12 projects the image projected by projection unit 11 onto a projection surface, while magnifying or reducing the size of the image. Lens unit 12 is configured with such as a zoom lens, for example.

Imaging unit 13 captures the images projected on the projection surface by other projectors 10, through use of lens unit 12. Imaging unit 13 is configured with an image sensor, such as, a charge-coupled device (CCD) or a complementary metal-oxide semiconductor (CMOS), for example.

Communication unit 14 communicates with other projectors 10 and control box 20. Communication unit 14 transmits items including: positional information on the projector concerned, positional information on the direction of projection by the projector concerned, imaging data imaged by imaging unit 13, and distance information on distances between other projectors and the projection surface. The communication unit also receives items including: positional information on other projectors, positional information on the directions of projection by other projectors, and a control signal fed from control box 20.

Computing unit 15 computes the positional information on the position of projector 10 concerned and on the direction of projection by the projector. Computing unit 15 computes the position via the global positioning system (GPS) and computes the direction of projection through use of a gyro sensor, for example. Then, computing unit 15 computes spacing information on the spacings between projector 10 concerned and other projectors 10, by using the positional information on projector 10 concerned and the positional information on other projectors 10 which is received by communication unit 14.

Moreover, computing unit 15 analyzes the imaging data of images which are imaged by imaging unit 13, with the images being projected on the projection surface by other projectors. Through the analysis, regarding the projection surface, the computing unit can compute angular information on angles between the directions of projection by other projectors 10 and the direction of imaging by projector 10 concerned. For example, by analyzing positional relations of image elements of the image rendered by the imaging data, the computing unit can compute the angular information. Here, in cases where the projection surface is the surface of a three-dimensional object and the like, computing unit 15 computes the angular information by a space encoding method, for example. Then, using Equation (1) shown below, computing unit 15 computes the distance information on the distances between other projectors and the projection surface, by using triangulation techniques. Such techniques use pieces of information, including: the angular information on the angles between the directions of projection by other projectors 10 and the direction of imaging by projector 10 concerned, regarding the projection surface; and the spacing information on the spacings between other projectors 10 and projector 10 concerned.

$$L = x/\tan\theta, \quad \text{Equation (1)}$$

L: the distance between each of other projectors and the projection surface;

x: the spacing between each of other projectors and the projector concerned; and θ: the angle between the direction of projection by each of other projectors and the direction of imaging by the projector concerned.

In this way, by using communication unit 14 and computing unit 15, projector 10 can obtain the accurate distance information on the distances between other projectors 10 and the projection surface.

As shown in FIG. 1, control box 20 includes communication unit 21 and controller 22.

Communication unit 21 communicates with the plurality of projectors 10. Communication unit 21 receives the positional information on the positions of projectors 10, the positional information on the directions of projection by the projectors, and the distance information on the distances between the projectors and the projection surface. The communication unit also transmits the positional information on the positions of projectors 10, the positional information on the directions of projection by the projectors, and the control signal.

Controller 22 generates an arrangement diagram of projectors 10 and the projection surface, based on the positional information on the positions of projectors 10, the positional information on the directions of projection by the projectors, and the distance information on the distances between projectors 10 and the projection surface, with the positional and distance information being received by communication unit 21. Moreover, if a problem exists in the arrangement diagram of the projection surface and projectors 10, the controller transmits a control signal to solve the problem via communication unit 21. Moreover, controller 22 includes a storage unit on the inside thereof. The storage unit records the positional information on the positions of projectors 10, the positional information on the directions of projection by the projectors, the distance information on distance between the projectors 10 and the projection surface, and the arrangement diagram of projectors 10 and the projection surface, with the positional and distance information being received by communication unit 21.

In this way, each of projectors 10 includes communication unit 14. On top of that, projector system S1 includes control box 20. This allows the projector system to perform centralized control and highly sophisticated data processing.

Figure 2:
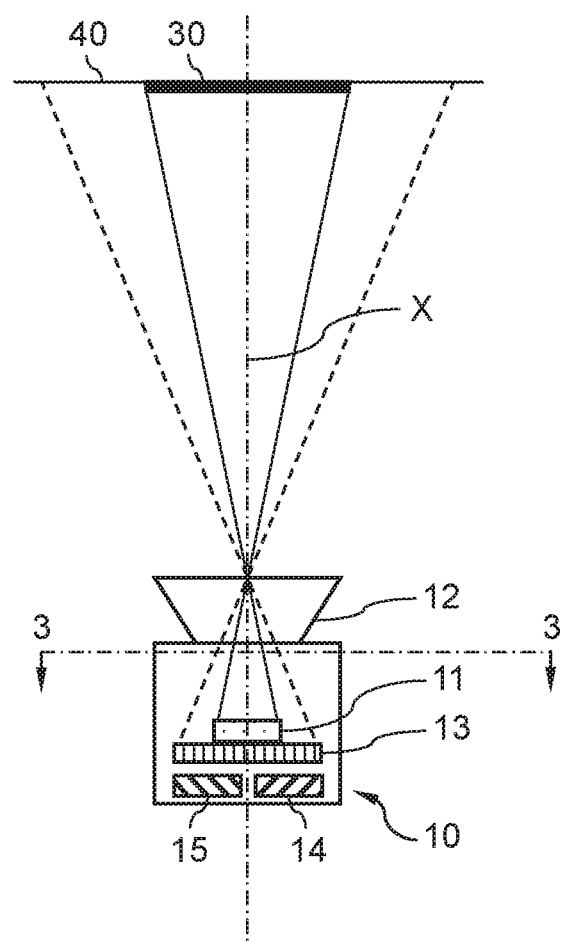
FIG. 2 is a schematic view of projecting and imaging operations of a projector according to the first embodiment.
Figure 3:
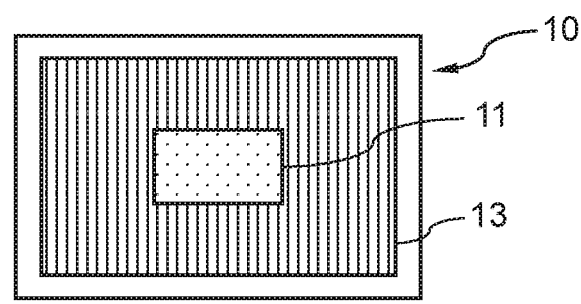
FIG. 3 is a view of an arrangement of a projection unit and an imaging unit according to the first embodiment.

FIG. 2 is a schematic view of projecting and imaging operations of projector 10 according to the first embodiment. FIG. 3 is a cross-sectional view of an arrangement of projection unit 11 and imaging unit 13, viewed from the direction of lens unit 12 and taken along line 3-3 of FIG. 2. As shown in FIG. 2 and indicated by the thin solid lines, projector 10 projects image 30, from projection unit 11 through lens unit 12 onto projection surface 40. Moreover, projector 10 images the periphery of image 30 on projection surface 40, with imaging unit 13 through lens unit 12, as indicated by the dashed lines. As shown in FIGS. 2 and 3, projection unit 11 is disposed on optical axis X along which the image is projected. Imaging unit 13 is larger in area than projection unit 11 when viewed from the direction of optical axis X, and is disposed in the state where the imaging unit is exposed from the periphery of projection unit 11. Imaging unit 13 is disposed on optical axis X along which the image is projected, and on the opposite side to lens unit 12 across projection unit 11.

With this configuration, imaging unit 13 can image a wide area outside of the periphery of image 30 projected on projection surface 40. In this way, projector 10 has an imaging region on the outside of the projection region of image 30 projected the projector by itself. This allows the projector concerned to image such images 30 projected by other projectors 10 on the outside of the projection region, while the projector concerned is projecting image 30 by itself on the projection region. In addition, imaging unit 13 is larger in area than projection unit 11 and can be disposed at the backward position of projection unit 11 (on the opposite side to lens unit 12). This eliminates the need for manufacturing the imaging unit in a special shape. That is, this leads to a reduction in volume of projector 10 with reduced manufacturing costs.

Figure 4:
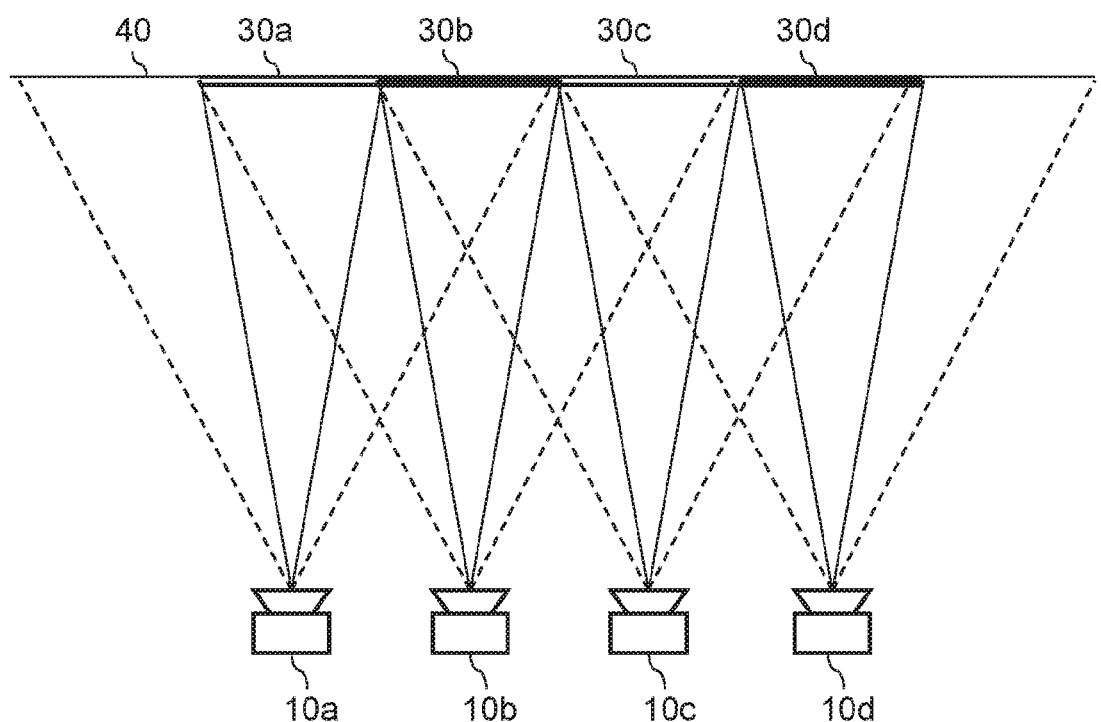
FIG. 4 is a schematic view of projecting and imaging operations of the projector system according to the first embodiment.

Next, projection and imaging operations of projector system S1 in which a plurality of projectors 10 is disposed will be described with reference to FIG. 4. FIG. 4 is a schematic view of projector system S1 in which the plurality of projectors 10a to 10d (four projectors shown in FIG. 4) project images 30a to 30d, respectively.

Projectors 10a to 10d are disposed and arrayed in the direction perpendicular to the direction of projection. These projectors project images 30a to 30d onto projection surface 40, respectively, from respective projection units 11. Images 30a to 30d are projected by projectors 10a to 10d, respectively, with the images being arrayed in the direction perpendicular to the direction of projection. Images 30a to 30d are preferably projected and arrayed without any space between them. However, even if any two images 30 adjacent to each other, which are projected by projector 10 concerned and the next projector 10, unfavorably overlap each other, at least a part of the image projected by the next projector is projected on the outside of the projection region of the image projected by the projector concerned. Therefore, projector 10 concerned is able to image such image 30 projected by the next projector 10.

As shown in FIG. 4, projector 10a images image 30b on the right of image 30a, with imaging unit 13 of the projector. Projector 10b images both image 30a on the left of image 30b and image 30c on the right of image 30b, with imaging unit 13 of the projector. Projector 10c images both image 30b on the left of image 30c and image 30d on the right of image 30c, with imaging unit 13 of the projector. Projector 10d images image 30c on the left of image 30d, with imaging unit 13 of the projector. Each of projectors 10a to 10d computes distance information on distances between projection surface 40 and the other projectors 10, with its own computing unit 15, by using the imaging data and positional information. Such imaging data are ones of corresponding images 30 of other projectors 10, which are imaged with respective imaging units 13. Such positional information is about both the positions of other projectors 10, and the directions of projection by other projectors 10, with the positional information being received by respective communication units 14.

In this way, the plurality of projectors 10a to 10d mutually captures images 30a to 30d of projectors 10a to 10d, thereby computing the distances between projectors 10a to 10d and projection surface 40. This allows projector system S1 to be configured with the projection and imaging units the number of which is a half of that in the case where the projection and imaging units are separately arranged in different apparatuses, i.e. projectors and cameras, respectively.

Moreover, the distance between projector 10b and projection surface 40 is computed separately by two projectors 10a and 10c. The distance between projector 10c and projection surface 40 is computed separately by two projectors 10b and 10d. For this reason, it is possible to increase computing accuracy of the distances between projectors 10b and 10c and projection surface 40. Alternatively, projectors 10a and 10d may be ones that include no imaging unit 13 and no computing unit 15. In this way, one projector images a plurality of the images, resulting in an increased degree of flexibility of the projector system.

In accordance with the configuration, projection unit 11 shares the same lens unit 12 with imaging unit 13; imaging unit 13 images the images projected by other projectors 10 while projection unit 11 is projecting another image; and computing unit 15 computes the distance information on the distances between projection surface 40 and projectors 10. In this way, the shared use of one lens unit 12 between projection unit 11 and imaging unit 13 allows a reduction in the number of the apparatuses used in the projector system, while reducing the volume and costs of the apparatuses.

Note that the projected and imaged images may be visible light images and invisible light images. For example, both the projected and imaged images may be visible light images. Alternatively, the configuration may be such that one of the projected and imaged images is a visible image whereas the other is an invisible (infrared) image.

Note that, in the embodiment, the descriptions have been made using the case where the four units of projectors 10 are used; however, three or not less than five units of projectors 10 may be used.

It is noted, however, that different projectors 10 may have different lens units 12. Lens units 12 of different projectors 10 may have different focal lengths, allowing an optional selection of the projection region and the imaging region. This can increase the degree of flexibility of the projector system.

Note that, in the embodiment, the descriptions have been made using the case where communication unit 14 receives the positional information on other projectors 10 and computing unit 15 computes the spacing information on the projectors. However, the configuration may be such that the plurality of projectors 10 is arranged at predetermined spatial intervals, and that spatial interval information as of the arrangement is recorded in the storage unit of computing unit 15 of each of projectors 10. With this configuration, it is also possible to configure the projector and projector system which are not equipped with any communication unit 14.

Note that, in the embodiment, the descriptions have been made using the case where projection unit 11 and imaging unit 13 each have a rectangular shape; however, their shapes are not particularly limited to it. For example, projection unit 11 and imaging unit 13 may have a circular shape or, alternatively, a round-cornered rectangular shape. In particular, imaging unit 13 can be made to have the same shape as that of an image circle of its lens, thereby utilizing the region of the image circle as wide as possible compared to the case of the imaging unit having a rectangular shape, resulting in an expanded imaging region.

Figure 5:
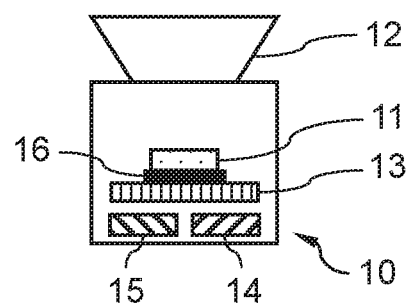
FIG. 5 is a schematic view of another projector according to the first embodiment.

Note that, in the embodiment, the descriptions have been made using the case where projection unit 11 is in contact with imaging unit 13 as shown in FIG. 1; however, the space between projection unit 11 and imaging unit 13 is not specifically limited. For example, projection unit 11 may be away from imaging unit 13. Alternatively, between projection unit 11 and imaging unit 13, plate 16 such as a metal or resin one may be interposed, as shown in FIG. 5. In this case, the region not imaged by imaging unit 13 can be clearly defined, thereby increasing its imaging sensitivity.

Figure 6:
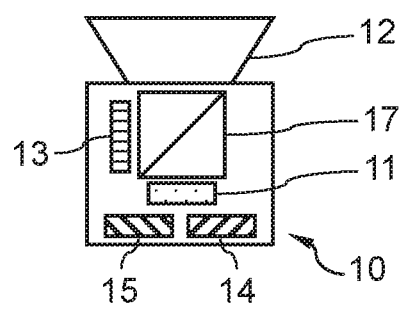
FIG. 6 is a schematic view of further another projector according to the first embodiment.

Note that, in the embodiment, the descriptions have been made using the case where projection unit 11 is disposed to overlap imaging unit 13 on optical axis X; however, its optical path may be split by using an optical-path splitting unit. As shown in FIG. 6, projector 10 includes prism 17 as the optical-path splitting unit, on the inside of the projector, with projection unit 11 and imaging unit 13 being disposed on different faces of prism 17. Visible light from projection unit 11 travels in straight lines through prism 17, and is projected through lens unit 12. Invisible light to be imaged travels through lens unit 12, and is reflected off prism 17 and imaged by imaging unit 13. This configuration allows elimination of the need for arranging projection unit 11 to overlap imaging unit 13, which in turn eliminates the need for preparing a component equipped with larger-area imaging unit 13, leading to reduced costs. Moreover, the imaging region of imaging unit 13 can be set to a desired one, by changing the angle of reflection of prism 17. Furthermore, other than the prism, the optical-path splitting unit may be a flat dichroic mirror or a diffraction grating, for example. In the case where wavelengths of the light subjected to the optical-path split are equal or nearly equal to each other, a half mirror can also be used as the optical-path splitting unit.

Figure 7:
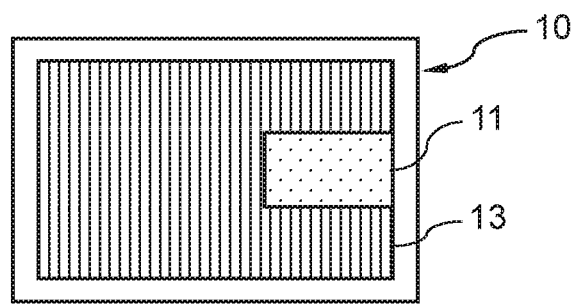
FIG. 7 is a view of an arrangement of another projection unit and another imaging unit according to the first embodiment.

Note that, in the embodiment, the descriptions have been made using the case where imaging unit 13 is arranged to surround the entire periphery of projection unit 11; however, imaging unit 13 needs not necessarily to surround the entire periphery. For example, as shown in FIG. 7, imaging unit 13 may be absent on the right side of projection unit 11. In this case, imaging unit 13 on the left side of projection unit 11 is capable of imaging objects over a wider region. In this way, there is no need for arranging imaging unit 13 uniformly on the outside of projection unit 11; therefore, imaging unit 13 may be arranged in an imbalanced positional state, in accordance with the positions of images 30 to be imaged.

Figure 8:
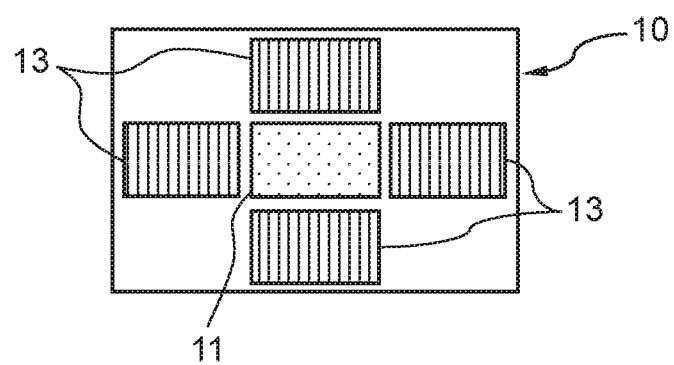
FIG. 8 is a view of an arrangement of further another projection unit and further another imaging unit according to the first embodiment.

Note that, in the embodiment, the descriptions have been made using the case where the number of imaging unit 13 is one; however, the number may be more than one. For example, as shown in FIG. 8, four imaging unit 13 may be disposed on the upper, lower, left, and right sides of projection unit 11. Alternatively, one imaging unit 13 may be disposed on a side of one projection unit 11. In this case, a component equipped with smaller-size imaging unit 13 can be used, which allows reduced manufacturing costs, compared to cases where a component equipped with larger-size imaging unit 13 or a component having a special shape is used.

Figure 9:
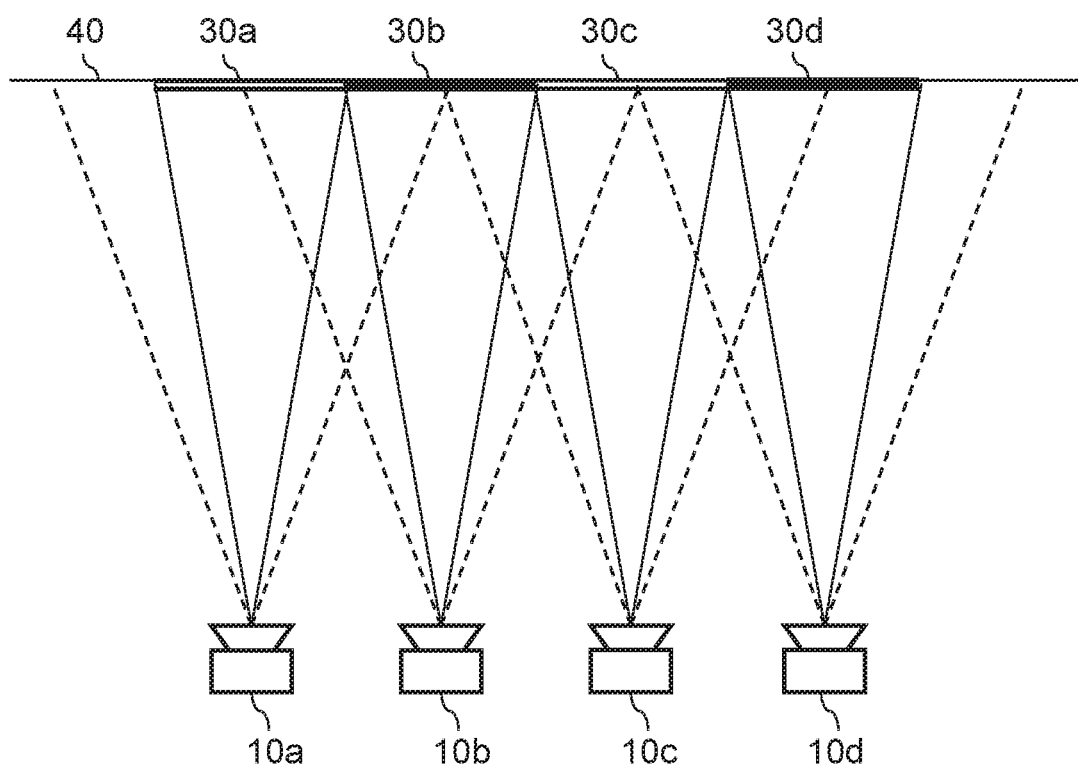
FIG. 9 is a schematic view of projecting and imaging operations of another projector system according to the first embodiment.

Note that, in the embodiment, the descriptions have been made using the case where one projector 10 images the entirety of image 30 projected by another adjacent projector 10, as shown in FIG. 4. However, for example, each of two projectors 10 may image a half of image 30, on a half-and-half basis, which is projected by another projector 10 adjacent to the two, as in the case shown in FIG. 9 where each of projectors 10*a* and 10*c* images a half of image 30*b*, on a half-and-half basis, which is projected by adjacent projector 10*b*. In this case, the area of imaging unit 13 can be reduced.

Note that, in the embodiment, the descriptions have been made using the case where each of projectors 10 includes computing unit 15; however, control box 20 instead may include a computing unit. In this case, projector 10 may transmit, via communication unit 14, the positional information on its own position and the imaging data of the image(s) projected by other projector(s) 10 and imaged by the projector. Control box 20 may receive, via communication unit 21, the positional information and imaging data which are transmitted from each of projectors 10. Then, the computing unit included in control box 20 may compute the distance between projection surface 40 for the images and each of projectors 10, by using the positional information and the imaging data.

Second Exemplary Embodiment

In the first embodiment, the descriptions have been made using the cases where the plurality of projectors 10 is disposed in a row, and yet where one projector 10 images images 30 projected by two projectors 10 disposed adjacent to and on the both sides of the projector concerned, thereby computing the distances between projection surface 40 and the two adjacent projectors 10. A second embodiment is different from the first embodiment in that a plurality of projectors 10 is disposed in a lattice, and that one projector 10 images image 30 projected by another projector 10 disposed in the proximity of the projector concerned, thereby calculating distance between projection surface 40 and the another projector 10.

Figure 10:
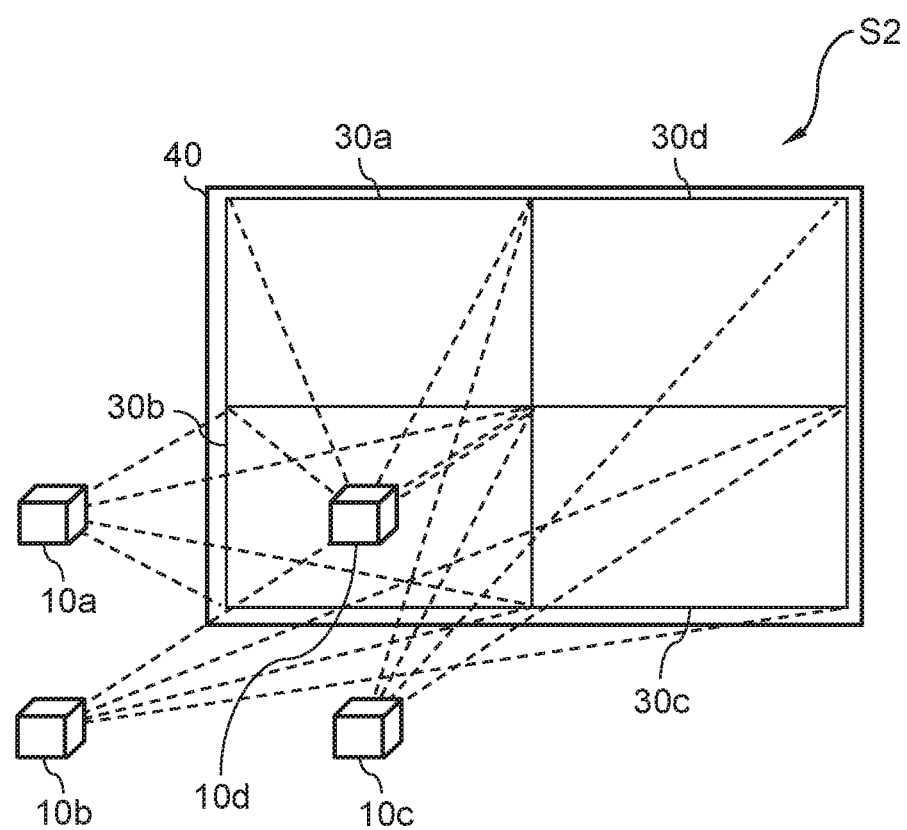
FIG. 10 is a schematic view of projecting and imaging operations of a projector system according to a second embodiment.

FIG. 10 is a schematic view of projector system S2 according to the second embodiment. In FIG. 10, the same constituent elements as those in the first embodiment are designated by the same numerals and symbols, and their duplicate explanations are omitted.

A plurality of projectors 10*a* to 10*d* (four projectors in FIG. 10) is disposed in a lattice, and project images 30*a* to 30*d* that are arrayed in a corresponding lattice, respectively. Then, each of projectors 10*a*, 10*b*, 10*c*, and 10*d* images images 30*b*, 30*c*, 30*d*, and 30*a* projected by projectors 10*b*, 10*c*, 10*d*, and 10*a*, respectively, with the images being arrayed, in this order, counterclockwise in the lattice. The dashed lines shown in FIG. 10 indicate correspondence between projectors 10*a*, 10*b*, 10*c*, and 10*d* and images 10*b*, 10*c*, 10*d*, and 10*a* which are imaged by the projectors, respectively.

That is, projector 10*a* images image 30*b* projected by projector 10*b*, while being projecting image 30*a*. Projector 10*b* images image 30*c* projected by projector 10*c*, while being projecting image 30b. Projector 10c images image 30d projected by projector 10d, while being projecting image 30c. Projector 10d images image 30a projected by projector 10a, while being projecting image 30d.

Descriptions will be made using a case of the projector system in which "n" units (e.g., n=4 in FIG. 10) of projectors 10 (k=integer 1 to n) are disposed in a lattice. Projectors 10k project images 30k to be arrayed in a lattice, in the same manner as for the lattice of projectors 10k. Then, each of projectors 10k images image 30k projected by another projector 10k adjacent to the projector concerned, as indicated by the dashed lines in FIG. 10. The choice of which of images 30k projected by other projectors 10k is imaged by projector 10k concerned, can be optionally determined in accordance with the lattice array of projectors 10k.

That is, in the embodiment, the descriptions have been made using the case where the lattice array of projectors 10 is an array of 2 rows×2 columns; however, the lattice may be another one. For example, in the cases where the array is 2 rows×(not smaller than 3 columns) or (not smaller than 3 rows)×2 columns, each of projectors 10 images image 30 that is projected by next projector 10 in an counterclockwise or clockwise one-images-the-next's basis, as shown in FIG. 10, which allows measurement of all distances between all projectors 10 and projection surface 40. Moreover, in the cases where the array is (not smaller than 3 rows)×(not smaller than 3 columns), images 30 are imaged as follows: For a plurality of projectors 10 disposed on the outermost periphery of the array, each of such projectors can image image 30 projected by another projector in the same manner as that described above. For a plurality of projectors 10, which configure a loop, disposed inside the outermost periphery of the array, each of such projectors as well can image image 30 projected by another projector in the same manner as that described above.

Moreover, each of projectors 10k includes: projection unit 11 for displaying image 30k, lens unit 12 for projecting image 30k that is displayed by projection unit 11, imaging unit 13 for imaging image 30k that is projected by another projector 10k, and computing unit 15. Then, computing unit 15 computes the distance between the another projector 10k and projection surface 40 on which image 30k is projected by the another projector 10k, by using the imaging data of image 30k projected by the another projector 10k, with the imaging data are obtained by imaging unit 13. That is, each of projectors 10k (k=1 to n-1) includes computing unit 15 that computes the distance between projection surface 40 of image 30k+1 and projector 10k+1, by using the imaging data of image 30k+1 which are imaged by imaging unit 13 of the projector concerned. Projector 10k (k=n) includes computing unit 15 that computes the distance between projection surface 40 of image 30k (k=1) and projector 10 (k=1), by using the imaging data of image 30k (k=1) which are imaged by imaging unit 13 of the projector concerned.

In this way, the plurality of projectors 10k mutually images such image 30k projected by another projector 10k among them, which allows the detections of distance, through many operations of projection and imaging. Then, this configuration allows implementation of projector system S2 having a wider projection region and a wider imaging region, in the upper, lower, left, and right directions. In this case, projector system S2 can be configured with the projection and imaging units the number of which is a half of that in conventional cases where the projection and imaging units are separately set in different apparatuses, i.e. projectors and cameras, respectively, on a one-unit for one-apparatus basis.

Figure 11:
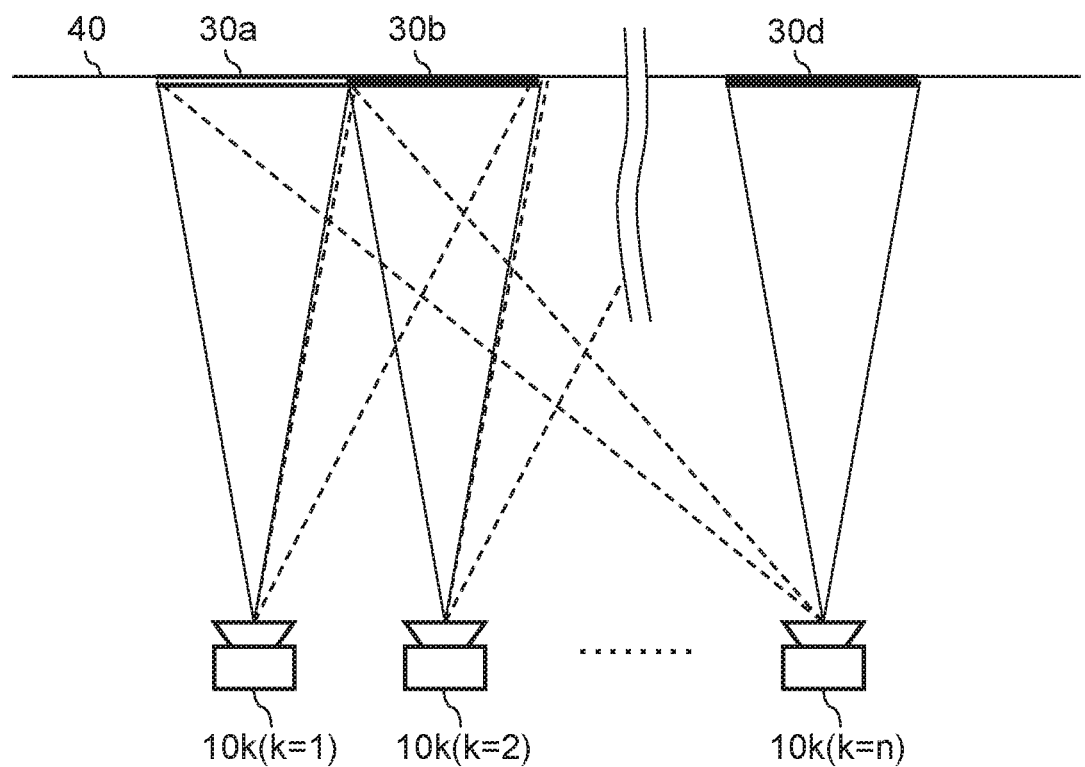
FIG. 11 is a schematic view of projecting and imaging operations of another projector system according to the second embodiment.

Note that, in the embodiment, FIG. 10 shows the case where four projectors 10a to 10d are disposed in the lattice; however, "n" units of projectors 10k (k=1 to n) may be disposed in a row as shown in FIG. 11. In this case, projectors 10k project images 30k in a row, in the same manner as for the row of projectors 10k. Then, projector 10k (k=1 to n-1) images image 30k projected by projector 10k+1 disposed adjacent to and on the right of the projector concerned. Projector 10k (k=n) images image 30k (k=1) projected by projector 10k (k=1) disposed at the leftmost position. In this case, projector 10k (k=n) is required to include imaging unit 13 disposed at a position where the imaging unit can image such image 30k (k=1).

Other Exemplary Embodiments

In the first and second embodiments, the descriptions have been made using the cases with the assumption that projection surface 40 has a flat surface and is fixed. However, projection surface 40 may have a three-dimensional shape, and may move within the projection region of the projector system. That is, projection surface 40 may be the surface of an object such as a ball, a balloon, clothes that someone wears, and the like. Such a projection object may travel.

Figure 12:
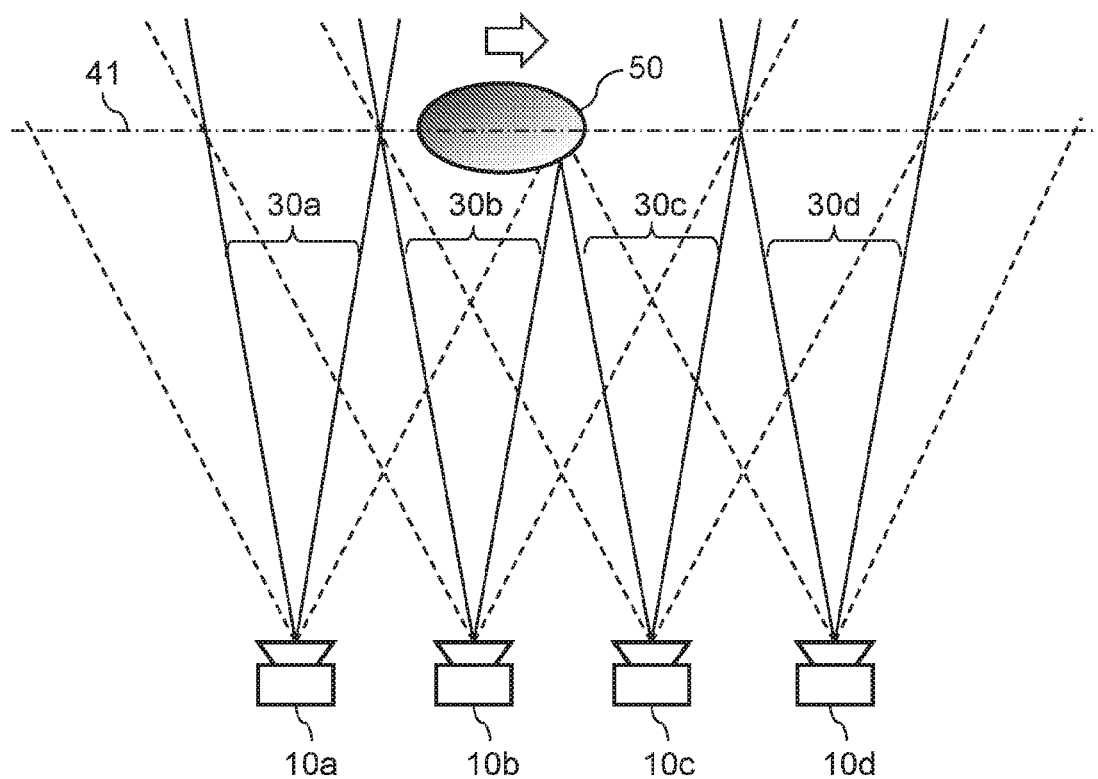
FIG. 12 is a schematic view of a projector system that projects an image on a projection surface according to another embodiment.

FIG. 12 is a schematic view of a projector system that projects images on projection object 50 that is traveling. Four projectors 10a to 10d are disposed in a row, and project images 30a to 30d onto virtual projection surface 41, respectively. As described in the first embodiment, each of projectors 10a to 10d can image, with its own imaging unit 13, the image projected by another projector among them. The dashed lines shown in FIG. 12 indicate the imaging region of each of projectors 10a to 10d. The imaging region can be changed by modifying the configuration of imaging unit 13, as described in the first embodiment. In the case shown in FIG. 12, projection object 50 is traveling on virtual projection surface 41 in the rightward direction (the direction from projector 10a to projector 10d). Then, onto the surface of projection object 50, a part of each of images 30b and 30c is projected by projectors 10b and 10c, respectively.

Image 30b projected on projection object 50 is imaged by imaging unit 13 of projector 10a. Thus, projector 10a obtains the imaging data of image 30b. Computing unit 15 of projector 10a computes a distance between projector 10b and the surface of projection object 50 onto which image 30b is projected, by using both the imaging data of image 30b and the spacing information on the spacing between projectors 10a and 10b. Likewise, image 30b projected on projection object 50 is imaged by imaging unit 13 of projector 10c as well. Computing unit 15 of projector 10c as well can compute the distance between projector 10b and the surface of projection object 50. Moreover, in the same manner as for this, image 30c projected on projection object 50 is imaged by imaging unit 13 of each of projectors 10b and 10d. Then, computing unit 15 of each of the projectors computes a distance between projector 10c and the surface of projection object 50 on which image 30c is projected.

In this way, the distances between projectors 10b and 10c and the surfaces of the projection object on which images 30b and 30c are projected are computed, respectively. This allows control of two images 30b and 30c such that the two are continuously projected onto the surface of a traveling projection object, without any spatial interval between the two, for example.

INDUSTRIAL APPLICABILITY

A projector and a projector system, which are equipped with apparatuses, according to the present disclosure allow a reduction in volume of the apparatuses and in the number of the apparatuses. This allows the projector and system to be useful as a projector and the like because of low costs and ease of installation.

What is claimed is:

1. A projector comprising:
   a spatial light modulator configured to display a first image;
   at least one lens configured to project the first image displayed by the spatial light modulator;
   at least one image sensor configured to capture, through the at least one lens, a second image projected by another projector; and
   a computing unit for computing a distance between a surface on which the second image is projected and the another projector, using
      imaging data of the second image captured imaged by the at least one image sensor, and
      spacing information on a spacing between the projector and the another projector.

2. The projector according to claim 1,
   wherein the computing unit computes angular information on an angle between a direction of projection of the second image and a direction of capturing of the second image, the angle being computed from a position of the second image projected by the another projector, the position being obtained from the imaging data of the second image; and
   the computing unit computes the distance between the surface on which the second image is projected and the another projector, the distance being computed from the angular information and the spacing information.

3. The projector according to claim 1, further comprising a communication unit for receiving positional information on the another projector from the another projector,
   wherein the computing unit computes the spacing information based on the positional information received by the communication unit.

4. The projector according to claim 1,
   wherein the spatial light modulator is disposed on an optical axis of projection of the first image, and
   the at least one image sensor is disposed on an outside of the spatial light modulator with respect to the optical axis.

5. The projector according to claim 4, wherein the at least one image sensor imaging unit comprises a plurality of image sensors.

6. The projector according to claim 4, wherein the at least one image sensor is disposed on an opposite side of the at least one lens across the spatial light modulator, in a direction of the optical axis.

7. The projector according to claim 1,
   wherein the at least one image sensor is disposed on an optical axis of projection of the first image, on an opposite side of the at least one lens across the spatial light modulator; and
   the at least one image sensor is larger in area than the spatial light modulator.

8. The projector according to claim 1, further comprising an optical-path splitting unit for splitting an optical path into an optical path from the spatial light modulator to the at least one lens and an optical path from the at least one lens to the at least one image sensor.

9. The projector according to claim 1, wherein at least a part of the second image captured by the at least one image sensor is projected on an area outside of a region in which the first image is projected by the spatial light modulator.

10. A projector system comprising:
    a first projector being the projector according to claim 1; and
    a second projector being the another projector according to claim 1.

11. The projector system according to claim 10,
    wherein the second projector includes:
       a second spatial light modulator configured to display the second image;
       at least one second lens configured to project the second image displayed by the second spatial light modulator;
       at least one second image sensor configured to capture the first image through the at least one second lens; and
       a second computing unit for computing a distance between the first projector and a surface on which the first image is projected, using
          imaging data of the first image captured by the second image sensor, and
          the spacing information on the spacing between the first projector and the second projector.

12. The projector system according to claim 10, further comprising a third projector for projecting a third image,
    wherein the computing unit computes a distance between the third projector and a surface on which the third image is projected, using
       imaging data of the third image captured by the at least one image sensor, and
       spacing information on a spacing between the third projector and the first projector.

13. A projector system comprising "n" units of first to n-th projectors each of which is the projector according to claim 1, "n" being an integer,
    wherein the another projector, according to claim 1, corresponding to each of the first to (n−1)-th projectors is a respective one of the second to n-th projectors; and
    the another projector, according to claim 1, corresponding to the n-th projector is the first projector.

14. A projector system comprising:
    a second projector for projecting a second image, the second projector including
       a second communication unit for transmitting positional information on the second projector;
    a first projector for projecting a first image, the first projector including:
       a spatial light modulator configured to display the first image;
       at least one lens configured to project the first image displayed by the spatial light modulator;
       an image sensor configured to capture the second image through the at least one lens; and
       a first communication unit for transmitting positional information on the first projector and for transmitting imaging data of the second image captured by the image sensor; and
    a control box for communicating with the first projector and the second projector, the control box including:
       a third communication unit for receiving the imaging data of the second image and the positional information on the first projector from the first communication unit, and for receiving the positional information on the second projector from the second communication unit; and
       a computing unit for computing spacing information on a spacing between the first projector and the second projector, and for computing a distance between the second projector and a surface on which the second image is projected, wherein the spacing is computed from the imaging data of the second image, the positional information on the first projector, and the positional information on the second projector, and wherein the distance is computed from the spacing information and the imaging data of the second image.

\* \* \* \* \*